United States Patent [19]

Krage et al.

[11] 4,403,504
[45] Sep. 13, 1983

[54] ENGINE TESTING MICROWAVE TRANSMISSION DEVICE

[75] Inventors: Mark K. Krage, Royal Oak; Alexander Meduvsky, Warren, both of Mich.

[73] Assignee: General Motors Corporation, Detroit, Mich.

[21] Appl. No.: 292,683

[22] Filed: Aug. 13, 1981

[51] Int. Cl.³ .............................................. G01M 15/00
[52] U.S. Cl. ................................. 73/116; 324/58.5 B; 333/248
[58] Field of Search ......... 73/116; 123/143 R, 169 R, 123/536; 324/58 R, 58 B, 58 C, 58.5 R, 58.5 B, 58.5 C; 333/12, 24 R, 99 R, 248, 252

[56] References Cited

U.S. PATENT DOCUMENTS 3,327,211  6/1967  Taub ............................... 333/248 X
3,589,177  6/1971  Merlo .................................. 73/116
3,703,825  11/1972 Merlo .................................. 73/116
3,934,566  1/1976  Ward ............................... 123/536 X
4,138,980  2/1979  Ward ................................. 123/536

OTHER PUBLICATIONS

Merlo, A. L. Combustion Chamber Investigations . . . Resonances from IEEE Transactions on Industrial . . . Instrumentation, Apr. 1970, pp. 60–66.

Primary Examiner—Jerry W. Myracle
Attorney, Agent, or Firm—C. R. Meland

[57] ABSTRACT

A microwave transmission device for transmitting microwave signals into and out of the combustion chamber of a spark ignited internal combustion engine. The device comprises a circular metallic waveguide that is adapted to encompass a resistor-type spark plug of the engine. An antenna element is disposed in the waveguide which excites it in the $TE_{11}$ mode whereby the internal resistor does not substantially attenuate microwave transmission. The waveguide has means for securely attaching it to the exterior of the spark plug such that the waveguide and spark plug have a common longitudinal axis.

6 Claims, 4 Drawing Figures

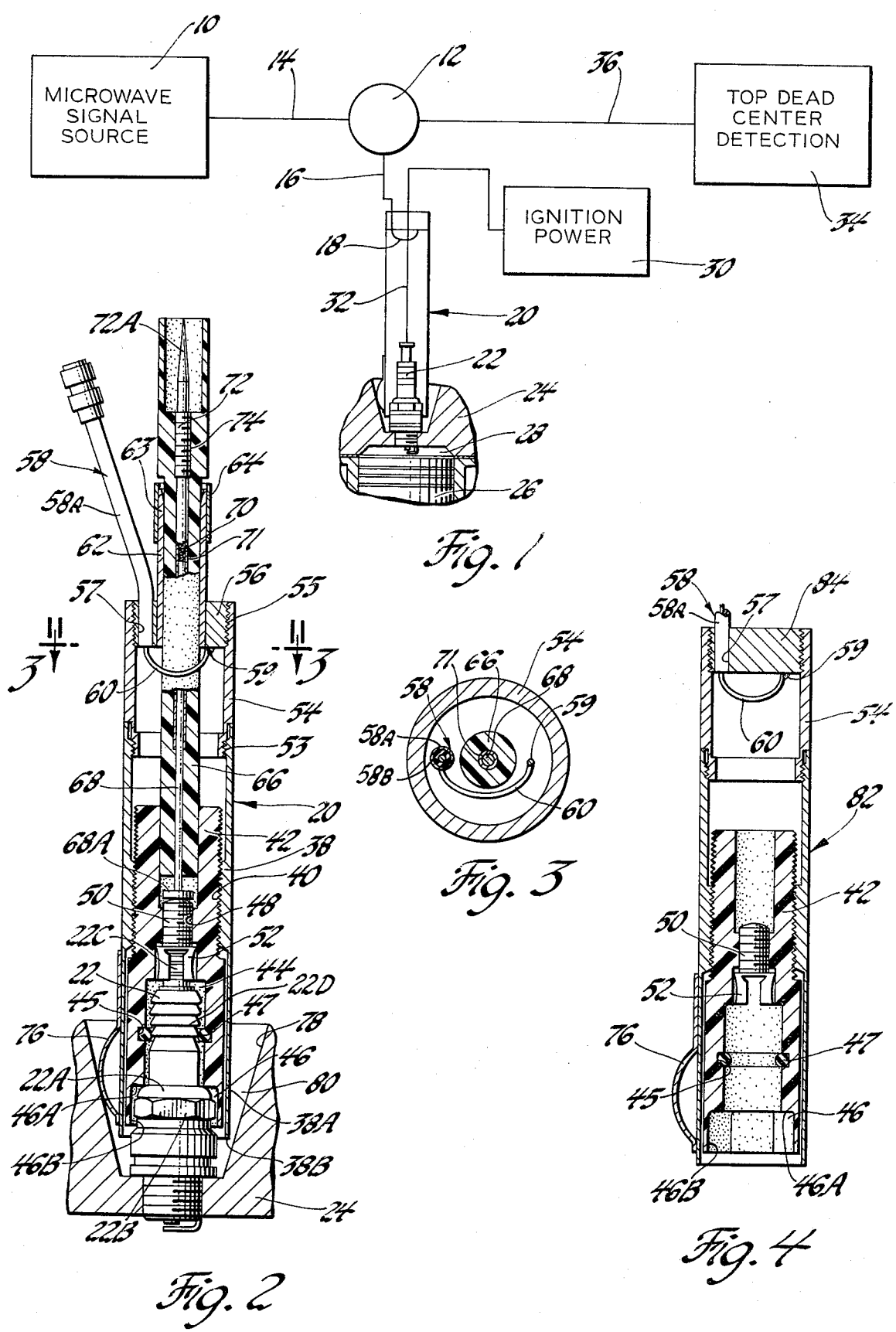

ered microwave transmission apparatus for transmitting microwave signals into and out of the combustion chamber of a spark ignited internal combustion engine.

It has been suggested in the prior art that a non-resistor type of spark plug could be used as part of a coaxial microwave transmission system (TEM mode) to transmit microwave signals into the combustion chamber of an internal combustion engine.

Resistor type spark plugs for spark ignited engines have an internal resistor, for example of 2 to 4,000 ohms connected in series with the center conductor. If this type of spark plug is utilized as part of a coaxial microwave transmission line (TEM mode) the resistor may attenuate the transmission of microwave signals into and out of the combustion chamber.

It has been discovered that the attenuation just described can be avoided by providing a microwave transmission line in which microwaves are transmitted to the resistor-type spark plug in a waveguide transverse electric mode and more particularly in the circular waveguide $TE_{11}$ mode. The waveguide is positioned relative to the spark plug such that the electric field is oriented transversely of the axis of the resistor in the plug and it therefore does not produce a significant power loss and consequently does not substantially attenuate transmission of the microwave signal.

It accordingly is an object of this invention to provide apparatus for transmitting microwave signals into the combustion chamber of an internal combustion engine via a resistor-type spark plug wherein the transmission system is arranged such that the resistor does not attenuate the transmission of microwave signals into or out of the combustion chamber. In its simplest form the device comprises a circular metallic waveguide, one end of which is axially moved over the resistor-type spark plug such that the spark plug is located in the waveguide. An antenna element is disposed within the waveguide and oriented transverse to the longitudinal axis of the waveguide and spark plug whereby the waveguide is excited in a transverse electric mode and more particularly the $TE_{11}$ mode.

Another object of this invention is to provide a device for transmitting microwave signals into the combustion chamber of an internal combustion engine that has a simple and reliable push-on/pull-off means of attachment to the spark plug.

In carrying this object forward a tubular metallic waveguide is provided which has an internal insulator socket. The insulator socket is arranged to engage the top end of the metal spark plug shell and carries a terminal clip that is adapted to capture the terminal end of the spark plug. The device can be simply axially pushed onto the spark plug and is adequately supported once fitted thereto. Further, the device is readily removed from the spark plug by pulling it axially off the spark plug.

Another object of this invention is to provide a device for transmitting microwave signals to the combustion chamber of an internal combustion engine and providing spark firing energy to the spark plug wherein the mode of microwave transmission is such that the conductor for supplying spark firing energy is isolated from the microwave signal without the use of filter elements.

Still another object of this invention is to provide a microwave transmission device for supplying microwave signals to an internal combustion engine and spark firing energy to the spark plug of the engine which is arranged so as not to capacitively load the ignition system to a point where a spark plug misfiring might occur.

Another object of this invention is to provide a device of the type described where the waveguide has outer spring finger contact elements that engage the spark plug well on the engine when the device is assembled to the spark plug. The contact elements electrically connect the waveguide and a metallic part of the engine to bleed off any induced charge on the waveguide.

IN THE DRAWINGS

FIG. 1 is a schematic circuit diagram of a system for microwave detection of the top dead center position of a piston of an internal combustion engine which incorporates the microwave transmission device of this invention;

FIG. 2 is a sectional view illustrating the microwave transmission device of this invention fitted over a spark plug of the engine;

FIG. 3 is an enlarged sectional view taken along line 3—3 of FIG. 2; and

FIG. 4 is a sectional view of a modified microwave transmission device for use in transmitting microwave signals to an internal combustion engine that is being cold motored and wherein the spark plug is not supplied with spark firing energy from the ignition system.

Referring now to the drawings and more particularly to FIG. 1, a system is illustrated for microwave top dead center detection of a piston of an internal combustion engine that utilizes the microwave transmission device of this invention. This system comprises a microwave signal source 10 connected to a three port microwave circulator 12 via a coaxial cable 14. The circulator is connected to a coaxial cable 16 that in turn is connected to an antenna element 18 that forms a part of the microwave transmission device 20 of this invention. The device 20 will be described in detail hereinafter. The lower end of the device 20 is fitted over a resistor type spark plug 22 of an internal combustion engine 24. The spark plug has an internal axially extending resistor and may be, for example, an AC type R46TS. One piston of the engine is designated by reference numeral 26 and the combustion chamber of the engine is designated by reference numeral 28.

The spark plug 22 is connected to a source of ignition power 30 on the engine by conductor 32. This source can be the ignition system provided for the engine.

The circulator 12 is connected to a top dead center detection system 34 by a coaxial cable 36. When the system of FIG. 1 is in operation the microwave signal source supplies microwave signals to the combustion chamber 28. The circulator 12 guides the signal it receives from line 14 to line 16 while blocking transmission between lines 14 and 36. The reflected signal from combustion chamber 28 is applied to line 16 and the circulator 12 guides it to line 36 while blocking transmission between line 16 and 14.

As explained in greater detail in patent application Ser. No. 228,313, filed on Jan. 26, 1981 and assigned to the assignee of this invention, the reflected signal from combustion chamber 28 will vary in amplitude depending upon the instantaneous position of piston 26. The reflected waveform is substantially symmetrical about the top dead center position of piston 26 and the system 34 receives this waveform and from it is capable of determining the top dead center position of the piston 26.

Referring now more particularly to FIG. 2 the microwave transmission device 20 will now be described in detail. The device comprises a circular metallic tube 38 which is formed, for example, of stainless steel. The tube 38 has an internal thread 40 which threadingly engages a complementary threaded portion of a cylindrical insulator socket 42 that is formed of electrical insulating material. The insulating material should be of a type that retains its shape and insulating property at relatively high temperature since it is subjected to the temperature of the spark plug. One material suitable for the insulator socket 42 is polytetrafluorethylene material sold under the trademark Teflon. The socket 42 has a bore 44 that fits over the spark plug 22 as shown in FIG. 2. The bore 44 is provided with an annular recess 45 that contains an O-ring 47 that is formed of a resilient elastomeric material. The bore 44 may have another annular recess (not illustrated) containing another O-ring axially spaced from the one shown on the drawing. The insulator socket 42 has another annular bore 46 which has an annular wall 46A that engages the top end of the annular metallic portion 22A of the spark plug 22. The insulator socket 42 has an internally threaded portion 48 which threadingly receives an externally threaded stud 50 formed of electrically conducting metallic material such as brass. The stud 50 is rigidly secured to a metal terminal clip 52 of the grid cap type. The terminal clip 52, as shown in FIG. 2, snaps over the terminal 22C of the spark plug 22.

The metal tube 38 is connected to another circular tube 54 which is formed of metallic material such as brass by the threaded connection 53. The tubes 38 and 54 define a continuous tube and the tube can be made as a one-piece part if so desired. The part 54 carries an annular part 56 which can be formed, for example, of brass material and which is connected to the upper end of part 54 by the threaded connection 55. The part 56 has an opening 57 that tightly receives one end of a coaxial cable 58 having an outer metallic sheath formed, for example, of copper. This outer sheath is soldered to part 56. The center conductor of the coaxial cable is looped about a spark plug firing conductor to be described and is connected to the metallic part 56, for example, by soldering one end of the wire thereto at point 59. This loop is designated by reference numeral 60 and forms an antenna element for the microwave transmission device. It is important to note that the antenna 60, as best shown in FIG. 3, extends transversely of the longitudinal axis of the microwave transmission device 20. The antenna 60 corresponds to the antenna 18 shown schematically in FIG. 1.

The annular part 56 has an upwardly extending tubular portion 62 formed of brass that has a conventional split collet portion 63. A brass nut 64 has a threaded connection (not illustrated) with an externally threaded part (not illustrated) of the collet portion 63. Disposed within the tubular part 62 and extending into a central opening in the insulator socket 42 is a tubular electrical insulator 66 formed of the same material as insulator socket 42. This insulator is gripped at its upper end by the collet 63 when nut 64 is tightened to secure the insulator from a movement relative to part 62. The insulator 66 has a bore that receives a brass rod conductor 68. The lower end of the conductor 68 has an annular portion 68A that engages the threaded stud 50. The conductor 68 is spring biased into engagement with the stud 50 by a spring 70 located within tube 71 formed of metallic material such as stainless steel. One end of tube 71 is welded or otherwise secured to a metallic conductor 72 disposed within insulator 66 and is connected to part 62 by the threaded connection 74.

The tubular part 38 (FIG. 2) carries three spring fingers, one of which is illustrated and identified by reference numeral 76. The spring metal fingers 76 are spaced by 120° about the periphery of the device and are formed as relatively narrow spring metal parts that are welded to part 38. These spring metal devices resiliently engage the inner wall 78 of the engine spark plug well 80. The purpose of the devices 76 is to make good electrical contact between metallic tube 38 and a metallic portion of the engine in order to bleed off any charge on the metallic tube 38 induced by the high voltage of the spark signal. The spring metal devices also serve, to some extent, to maintain the device 20 in the upright position shown in FIG. 2 when the device is pushed onto the spark plug.

The transmission device of FIG. 2 is used when the engine is being run under its own power or hot tested, that is the spark plugs are fired and the combustion chambers are supplied with a combustible mixture. The portion 72A of conductor 72 is connected to a spark plug wire coming from the ignition system distributor and the spark plug is fired from the ignition system of the engine. The conductive path for firing the spark plug from the ignition system is conductor 72, spring 70, conductor 68, stud 50 and clip 52 which is electrically connected to the spark plug terminal.

In some instances it may be desirable to determine top dead center while the engine is being cold motored, that is, when the engine is being driven, for example, by a prime mover such as an electric motor. In this arrangement the spark plugs are not fired and the modified device of FIG. 4 can be used when the engine is cold motored. This device is generally designated by reference numeral 82 and is similar to the one shown in FIG. 2 with the exception that it does not utilize a spark plug energizing conductor for firing the spark plug. In FIG. 4 the same reference numerals have been used as were used in FIG. 2 to identify corresponding parts. In the FIG. 4 arrangement an annular metal part 84 is threaded to the tubular metallic part 54. The part 84 has an opening 57 receiving the coaxial cable 58 and the cable has a conductor 60 forming an antenna identical with the antenna 60 shown in FIGS. 2 and 3. The antenna extends transversely of the longitudinal axis of the device 82 and as such excites the tubular waveguide in a transverse electric mode.

In utilizing the microwave transmission device of this invention, whether it be of the type shown in FIG. 2 or of the type shown in FIG. 4, the device is axially pushed over the spark plug until it assumes the position shown in FIG. 2. When the device is in the FIG. 2 position it is maintained fixed relative to the spark plug. This is due in part to the fact that the terminal clip 52 snaps onto the terminal 22C of the spark plug. Further, the O-ring 47 is compressed between the groove 45 and the insulator portion 22D of the spark plug and therefore tightly grips the insulator portion of the spark plug. Further, the springs 76, to some extent, aid in maintaining the transmission device in a fixed upright position as shown in FIG. 2 once the device has been fitted to the spark plug since they are compressed against wall 78.

In order to remove the device from the spark plug the entire device is simply pulled axially off the spark plug. It will be appreciated by those skilled in the art that the device could be attached and removed from the spark plug by hand or could be applied thereto by automated equipment that would slidably support the device for application to and removal from the spark plug.

It has been previously pointed out that the transmission device of this invention does not capacitively load the ignition system to a point where spark plug misfiring might occur. It will be appreciated by those skilled in the art that there is a certain amount of capacitance between the conductor 68 and the tubular metallic part 38 that depends upon the radial distance between these parts. There also is some small capacitance between the tubular metallic part 38 and the metallic part of the engine which is bypassed by fingers 76. It is important that the capacitance between conductor 68 and tubular part 38 be maintained at a minimum so as not to capacitively load down the ignition system to shunt current away from the spark plug. This is accomplished with the transmission device of this invention by providing sufficient distance between the conductor 68 and the tubular metallic part 38 so that this capacitance will be substantially less than an amount that would load down the ignition system. Thus, this capacitance is kept substantially below fifty picofarads.

In regard to the microwave transmission system of this invention it has been pointed out that the antenna 60 is located transversely of the longitudinal axis of the device 20 and therefore transversely of the axially extending internal resistor of the spark plug 22. The tubular metallic parts 54 and 38 form a metal circular waveguide which, as previously pointed out, could be made in one-piece, that is excited in the transverse electric mode and namely the TE$_{11}$ mode. The transmission device of this invention has acceptable performance when the microwave excitation frequency is in the range of 8 to 13.5 GHz. The device 20 can be tuned by rotatably adjusting the part 56 via the threaded connection 55 relative to the tubular part 54 to cause part 56 to be axially displaced.

Since the circular waveguide is excited in the transverse electric mode the internal resistor of the spark plug 22 does not substantially attenuate the transmission of microwave signals into and out of the combustion chamber 28. This is because the electric field in the circular waveguide extends transversely of the axially extending resistor in the spark plug 22 with the result that there is little or no power loss in the resistor. In this regard, it is pointed out that when the waveguide is in position on the spark plug the waveguide and spark plug have a common longitudinal axis and the resistor in the spark plug extends axially along this axis.

It has further been discovered that when the waveguide is excited in the TE$_{11}$ mode it is not necessary to utilize filter elements in the spark plug conductor line to isolate it from the microwave signals. Thus, microwave signals applied to the antenna element 60 are not coupled to the center spark plug line or conductor comprised of the various metallic parts including conductor 68 and designated schematically as 32 in FIG. 1. Further, the spark firing impulses applied to conductor 68 and the other portions of the center conductor are not coupled into the antenna 60 because of the loop orientation of the antenna 60, that is, the field generated about the center spark plug line is so oriented as to not induce any significant voltage in the antenna loop 60.

As previously mentioned, the spring fingers 76 bleed off the charge on metallic waveguide tube 38. This charge is the electrical potential of the capacitance formed by the center spark line 68 and metallic part 38. The spring fingers 76 play no part in the transmission of microwave signals into the combustion chamber.

In FIG. 2 the spark line or conductor is comprised of conductive parts 68, 70 and 72. These parts could be replaced by a one-piece conductor connected to stud 50.

The TE$_{11}$ mode designation, as used herein, follows the well known method of designating modes of transmission. The TE$_{11}$ designation refers to a transmission mode having a transverse electric field and no axial component of electric field. The first subscript refers to the order of the Bessel function involved and the second subscript refers to the number of the root of the derivative of this Bessel function. This is all well known to those skilled in the art.

As previously mentioned, the annular wall 46A of socket 42 engages portion 22A of the spark plug. The bore 46 is defined by another annular and axially extending wall 46B which is disposed about and slightly radially spaced from the edges of the metallic hexagonal nut portion 22B of the spark plug. The length of the lower end of waveguide 38, between a point designated by reference numeral 38A and the lower end 38B of the waveguide, is approximately one-quarter wavelength long. This portion of the waveguide overlaps a length of the metal shell of the spark plug as shown and provides a non-contacting RF short to prevent leakage of microwave energy out of the open end of the lower end of the waveguide.

In summary, the circular waveguide in the embodiments of FIGS. 2 and 4 is excited by the antenna in the TE$_{11}$ transmission mode which has no axially directed electric field and consequently does not cause an axial current flow through the axially extending internal resistor of the spark plug which otherwise would result in a power loss. The microwave signal is transmitted through the spark plug to the combustion chamber. The center spark plug energizing line used in FIG. 2 does not contribute to microwave transmission and is not utilized at all in the FIG. 4 embodiment. Its purpose is to provide spark firing current to the spark plug when the engine is to be hot tested.

The antenna 60, as previously pointed out, is formed by one end of the metallic center wire conductor of the coaxial cable 58. The outer metallic sheath 58A of coaxial cable 58 is separated from the center conductor by electrical insulating material 58B. In order to form metallic wire antenna 60 a length of insulation 58B and outer metal sheath 58A is removed to expose a length of center conductive wire forming antenna 60. This wire is solid and of sufficient stiffness that it retains its position or shape once it is formed to the shape shown in the drawings and connected to part 56.

The embodiments of the invention in which an exclusive property or privilege is claimed are defined as follows:

1. Apparatus for transmitting a microwave signal into the combustion chamber of a spark-ignited internal combustion engine and for transmitting a reflected microwave signal therefrom, comprising in combination:
  a microwave signal source, a resistor-type spark plug having an internal axially extending resistor and electrodes communicating with the combustion chamber of said engine, an elongated metallic waveguide having an axially extending part thereof encompassing at least a portion of said spark plug;

an antenna element coupled to said microwave signal source, said antenna element located within said waveguide and so positioned relative thereto as to cause the waveguide to be excited in a transverse electric mode with an electric field that is transverse to the longitudinal axis of the spark plug and internal resistor thereof when the antenna element is excited by said microwave signal source, said mode having substantially no axially directed electric field whereby the internal resistor of the spark plug does not substantially attenuate the transmission of the microwave signals into and out of the combustion chamber.

2. Apparatus adapted to receive a resistor-type spark plug of an internal combustion engine for transmitting a microwave signal into the combustion chamber of the engine and for transmitting a reflected microwave signal therefrom, comprising in combination:

an elongated circular metallic waveguide having an axially extending portion adapted to axially receive and encompass at least a portion of the spark plug when the device is axially applied thereover, said device being adapted to be positioned such that the axially extending portion of the waveguide and the spark plug have a common longitudinal axis; and an antenna element located within said waveguide that extends transversely of the longitudinal axis of the waveguide so as to cause the waveguide to be excited in the $TE_{11}$ mode when the antenna element is excited by a microwave signal source, said mode having substantially no axially directed electric field whereby the internal resistor of the spark plug does not substantially attenuate the transmission of the microwave signals into and out of the combustion chamber.

3. Apparatus adapted to be secured to the exterior of a resistor-type spark plug of an internal combustion engine for transmitting a microwave signal into the combustion chamber of the engine and for transmitting a reflected microwave signal therefrom, comprising in combination:

an elongated circular metallic waveguide having an axially extending portion adapted to axially receive and encompass at least a portion of the spark plug when the device is axially applied thereover, said device including means engageable with the spark plug for securing the device to the spark plug in a position such that the axially extending portion of the waveguide and the spark plug have a common longitudinal axis; and an antenna element located within said waveguide that extends transversely of the longitudinal axis of the waveguide so as to cause the waveguide to be excited in the $TE_{11}$ mode when the antenna element is excited by a microwave signal source, said mode having substantially no axially directed electric field whereby the internal resistor of the spark plug does not substantially attenuate the transmission of the microwave signals into and out of the combustion chamber.

4. Apparatus for transmitting a microwave signal into the combustion chamber of an internal combustion engine and for transmitting a reflected microwave signal therefrom, comprising in combination:

a resistor type spark plug having electrodes located in the combustion chamber of the engine and having an axially extending internal resistor connected in series with the center electrode of the spark plug;

a metallic circular waveguide, one end portion of the waveguide encompassing at least a portion of the spark plug that is located exterior of the combustion chamber, said end portion of the waveguide and spark plug having a substantially common longitudinal axis; and an antenna element located within said waveguide extending transversely of said common longitudinal axis of said waveguide and spark plug whereby the waveguide is excited in the $TE_{11}$ mode when the antenna element is excited by a microwave signal source and whereby the internal resistor of the spark plug does not substantially attenuate the transmission of the microwave signals into and out of the combustion chamber.

5. A microwave transmission device adapted to be secured to the exterior of a spark plug of an internal combustion engine comprising:

an elongated tubular metallic waveguide;

means for securing the waveguide to the spark plug comprising an insulator socket supported by and located within the waveguide;

conductor means in said waveguide adapted to be connected to the terminal of the spark plug for supplying spark firing current thereto;

an antenna element disposed within said waveguide adapted to be connected with a microwave signal source; and resilient electrical contact means secured to the outer wall of the waveguide adapted to engage a metallic part of the engine to electrically connect the engine and waveguide to thereby bleed off any induced electrical charge on the waveguide.

6. A microwave transmission device adapted to be secured to the exterior of a spark plug of an internal combustion engine comprising:

an elongated tubular metallic waveguide;

an insulator socket formed of electric insulating material disposed within and secured to the waveguide having an axially extending bore;

spring clip means fixed to said insulator member and disposed within said bore adapted to capture the terminal end of the spark plug when the device is axially applied over the spark plug;

at least one annular groove formed in the internal wall of said bore;

a resilient O-ring positioned in said groove adapted to tightly engage the insulator portion of the spark plug when the device is attached thereto; and an antenna element disposed within said waveguide adapted to be connected with a microwave signal source.

* * * * *